Aug. 17, 1926.

A. MORTIMER 1,596,064

VENTILATING DEVICE FOR VEHICLES

Filed April 6, 1925    2 Sheets-Sheet 1

INVENTOR
A. MORTIMER
BY
ATTORNEYS

Aug. 17, 1926.
A. MORTIMER
1,596,064
VENTILATING DEVICE FOR VEHICLES
Filed April 6, 1925   2 Sheets-Sheet 2
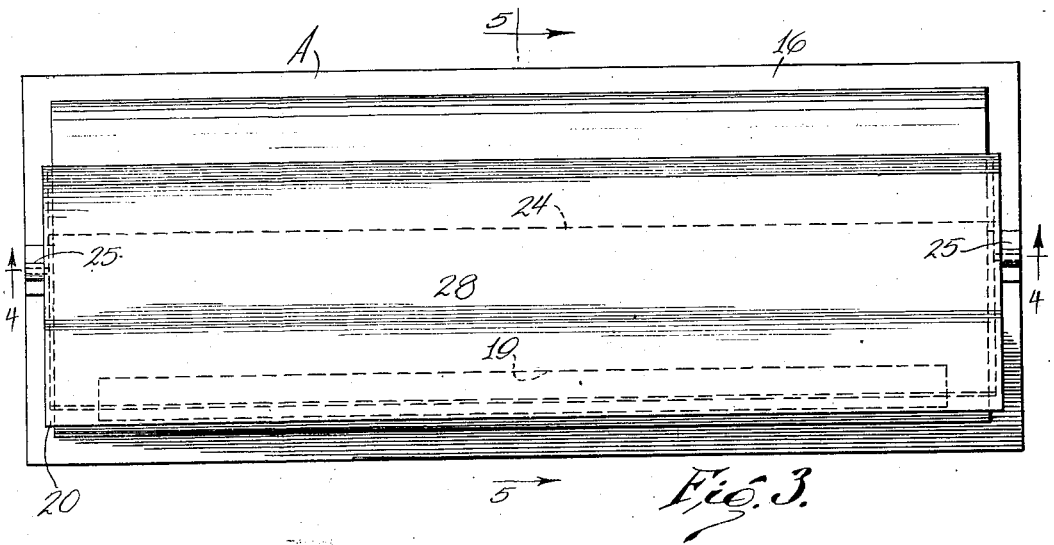
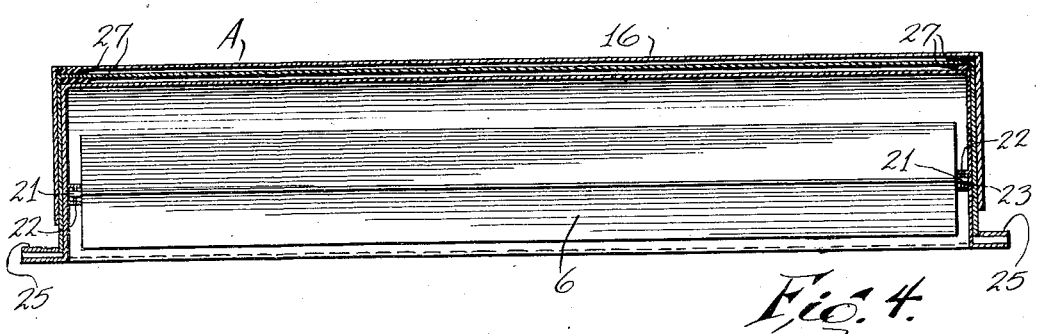
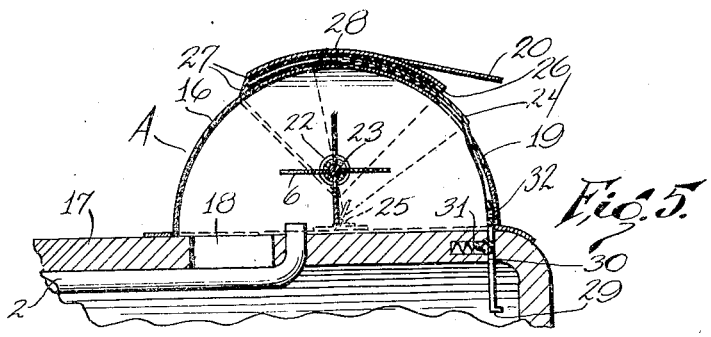
INVENTOR
A. MORTIMER
BY
ATTORNEYS Patented Aug. 17, 1926.

1,596,064

UNITED STATES PATENT OFFICE.

ALBERT MORTIMER, OF CHICAGO, ILLINOIS.

VENTILATING DEVICE FOR VEHICLES.

Application filed April 6, 1925. Serial No. 21,075.

My invention relates to improvements in ventilating devices for vehicles, and it consists in the combinations, constructions, and arrangements herein described and claimed.

An object of my invention is to provide a ventilating device for vehicles in which means is provided for conveying air into the vehicle and for forcing the foul air from the vehicle without causing a draft.

A further object of my invention is to provide a ventilating device for vehicles in which a portion of the air drawn into the vehicle is used for actuating the mechanism that drives the foul air from the vehicle.

A further object of my invention is to provide a device of the character described which is extremely simple in construction, and which may be attached to the vehicle or street car with but slight alterations being necessary in the latter.

Other objects and advantages will appear in the following specification, and the novel features of the invention will be particularly pointed out in the appended claims.

My invention is illustrated in the accompanying drawings forming part of this application, in which—

Figure 1:
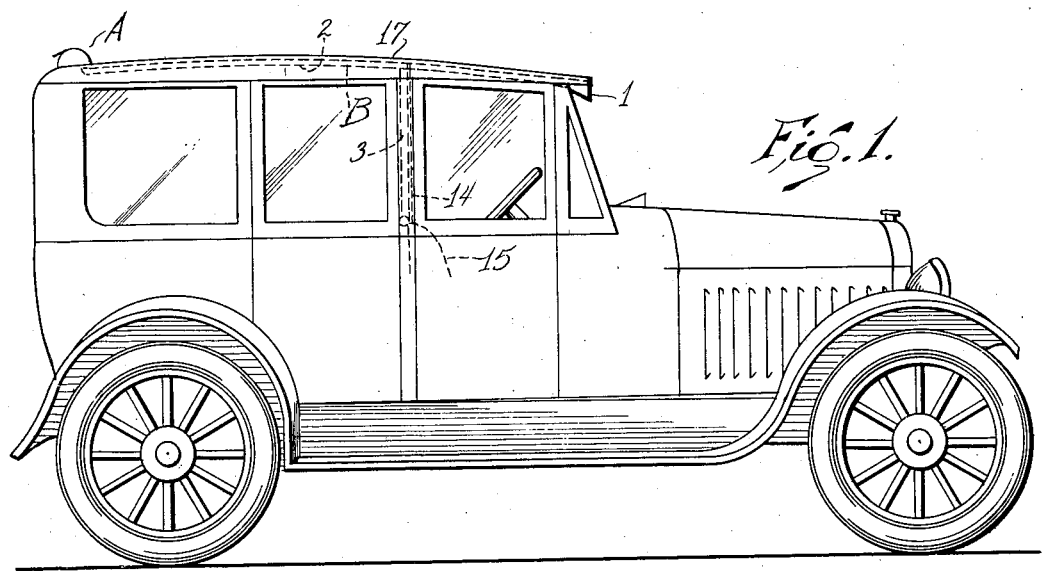
Figure 2:
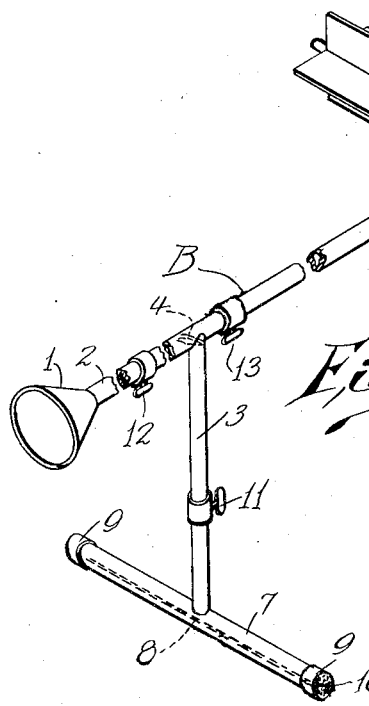
Figure 6:
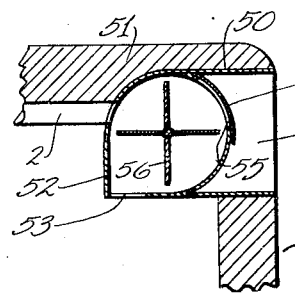

Figure 1 is a side elevation of an automobile showing the device operatively applied thereto, Figure 2 is a perspective view of the device, Figure 3 is a plan view of the exhaust fan, Figure 4 is a section along the line 4—4 of Figure 3, Figure 5 is a section along the line 5—5 of Figure 3, Figure 6 is a sectional view of a modified form of the device.

In carrying out my invention I provide a foul air exhaust device A and a fresh air inlet tube B. In Figure 1 I show how the device A is disposed at the rear and top of an automobile, and I also show how the tube B extends from the front of the automobile to the device A, whereby the movement of the car along the road will cause air to enter the tube B and be conveyed to the exhaust device A. Figure 2 clearly shows the construction of the tube B, and it will be noted from this figure that the tube B has a funnel shaped end 1 that communicates with a pipe 2, the pipe in turn having a branch pipe 3 that extends at right angles thereto. A deflector plate 4 is disposed at the junction of the pipe 2 with the pipe 3 and is adapted to convey a portion of the air that enters the pipe 2 down to the pipe 3. The end of the pipe 2 is turned upwardly as at 5 so as to direct the air against a fan 6. The air that flows through the pipe 2 will therefore cause the fan to rotate in the direction of the arrow.

The branch pipe 3 carries at its free end a transversely extending pipe 7. This pipe has a slot 8 cut therein, the slot extending from end to end of the pipe 7. Caps 9 are secured to the ends of the pipe 7 and are perforated at 10 so as to allow the air to pass therethrough. It will be seen from this construction that the air flowing into the car will be broken into streams so fine that the occupants of the car will feel no draft. The air in passing from the pipe 3 passes through the slot 8 and the perforated ends 9. A valve 11 controls the flow of air through the pipe 3.

The entire device may be shut off if desired by turning the valve 12, while the fan can be shut off by turning the valve 13. Since the fan is disposed at the top of the car, as shown in Figure 1, the heated air may cause the fan to slowly rotate even though the valve 13 is closed, due to the fact that the fan is carried by ball bearings, as will be hereinafter set forth.

The car shown in Figure 1 has a partition 14 that divides the driver's compartment from the rear of the car. When a car of this type is used I prefer to run the pipe 3 down along the side of the partition 14 and to dispose the pipe 7 across the upper edge of the front seats 15. It is obvious that the position of the pipe 3 within the car may be changed for cars of different makes. The pipe 2 may be secured to the under surface of the top of the car if desired or may be built into the car. The only thing necessary is to place the funnel 1 on the outside of the car and to have the curved end 5 disposed adjacent to the fan 6.

The special construction of the foul air exhaust A is shown in Figures 3, 4 and 5. In this form of the device the casing 16 enclosing the fan 6 is mounted upon the top of the car as heretofore stated. Figure 5 shows how the casing 16 is curved so as to provide an air passageway that passes over the top of the fan 6. The top 17 of the car has an opening 18 therein that communicates with the interior of the casing 16 and with the interior of the car. The foul air will flow through this opening and into the interior of the casing 16, due to the fact that the foul air is always heated more than the incoming air. The casing 16 has an opening 19 through which the foul air passes out into the atmosphere. This opening is protected from rain by means of a hood 20.

The fan 6 in the present form of the device comprises four blades that are mounted upon a shaft 21. The ends of the shaft 21 are rotatably disposed in journals 22. The journals 22 carry ball bearings 23, whereby the fan is frictionlessly mounted and may be rotated easily. In fact, as heretofore stated, the rush of the foul air up the opening 18 is sufficient to rotate the fan 6 without the added means of the air flowing through the pipe 2. It is preferable, however, to have the valve 13 partially open at all times so as to continuously rotate the fan 6 and thus keep the air constantly changing within the interior of the car.

Figure 5 clearly shows how I provide novel means for regulating the amount of air flowing through the opening 19. If desired I can completely shut off the flow of air from the car. The means for controlling the air comprises a shutter 24 that is adapted to slidably contact with the exterior surface of the casing 16. The shutter 24 is journaled in bearings 25, whereby the shutter may be swung into a position to close the opening 19 or into a position where it is entirely received within a compartment 26. In Figure 5 I show how the shutter 24 partially closes the opening 19. Rubber strips 27 are disposed between the casing 16 and the outer wall 28 of the compartment 26. These strips prevent the shutter 24 from rattling which is an essential point in devices that are carried by moving vehicles, such as automobiles. It is obvious that strips of other material may be used if desired, the main purpose being to provide strips that will prevent the shutter 24 from rattling and at the same time permit the shutter to be swung into operative or inoperative position.

The shutter may be moved into any position desired and there locked in place. This is accomplished by means of a flexible handle 29 that has one of its ends connected with the shutter 24 and its other end slidably disposed in a bore 30 that extends through the top 17 of the car. A spring pressed ball 31 is disposed in the top of the car and is adapted to enter any one of a number of openings 32 in the handle 29. The person within the car may move the handle 29 so as to swing the shutter 24 into the desired position. One of the openings 32 will then be aligned with the spring pressed ball 31, whereupon the ball will prevent accidental movement of the handle 29 in either direction. The spring pressed ball 31 is strong enough to hold the handle 29 against accidental movement, but at the same time permits the handle to be manually moved so as to swing the shutter 24.

From the foregoing description of the various parts of the device the operation thereof may be readily understood. I have already shown how the device is attached to the car and how the flow of air into the car may be regulated at the will of the occupants within the car. The valves 11, 12 and 13 provide a simple means for controlling the flow of air into the car and for also controlling the amount of air that impinges against the fan blades. The pipe 7 may be of any length desired and I prefer to have it extend the entire length of the two front seats so as to cause an even flow of air to enter the car. The principal purpose of the slot 8 and the perforated ends 10 is to break up the air into fine streams, thus preventing any draft from striking the occupants of the car. In addition to the valves 11, 12 and 13 for controlling the flow of air into the car, I provide the shutter 24, as heretofore stated, for controlling the flow of air out of the car. By closing the valve 12 and the shutter 24 the flow of air into the car and the flow of air out of the car is completely stopped. The valve 12 and the shutter 24 may be swung into any position desired so as to allow any desired quantity of air to enter or leave the car.

In Figure 6 I show a slightly modified form of the foul air exhaust. In this form of the device the exhaust casing 50 is built directly in the top of the car 51 and therefore the outer surface of the top will resemble the outer surface of a standard car. This form of the device may be used in case the owner of the car does not wish to attach the device A to the top of the car as shown in Figure 1. The device C shown in Figure 6 functions in identically the same manner as does the device A and is only altered in design so as to adapt it to be built in the car. In this form of the device the pipe 2 enters the casing 52. The casing 52 has an opening 53 that communicates with the interior of the car and permits the foul air from the car to flow into the casing. A shutter 54 controls the amount of air flowing through the opening 55 in the same manner as the shutter 24. A fan 56 similar to the fan 6 is mounted within the casing 52 and functions in the same manner as the fan 6. Since this form of the device operates in the same manner as the form already described it is not necessary to describe this form of the device any further.

I claim:—

1. A conduit for conveying air, a pipe in communication with said conduit, said pipe having openings therein for permitting the air to pass therethrough, means for causing a portion of the air flowing through said conduit to flow through said pipe, a foul air exhaust disposed at the inner end of said conduit, a fan carried by said exhaust, said fan being actuated by the air flowing from said conduit.

2. A device of the type described comprising an exhaust fan for withdrawing air from a vehicle or the like, an air inlet for conveying a stream of air against said exhaust fan for operating the latter, means for deflecting a portion of the air from said air inlet into the vehicle, and means for controlling the flow of air to said fan and through said air-deflecting means.

3. A ventilating device for vehicles comprising an air inlet having an opening facing the front end of the vehicle, an exhaust fan for withdrawing air from the vehicle, means for conveying air from said inlet to said exhaust fan to operate the latter, a branch pipe communicating with said conveying means between said inlet and said fan for conveying a portion of the air into the interior of the vehicle, and means for controlling the flow of air.

ALBERT MORTIMER.